(12) United States Patent
Mercer (10) Patent No.: US 10,191,278 B2
(45) Date of Patent: Jan. 29, 2019

(54) OPTICAL INSTRUMENTS

(71) Applicant: VISION ENGINEERING LIMITED, Surrey (GB)

(72) Inventor: Graham Peter Francis Mercer, Hampshire (GB)

(73) Assignee: VISION ENGINEERING LIMITED, Surrey (GB)

( * ) Notice: Subject to any disclaimer, the term of this patent is extended or adjusted under 35 U.S.C. 154(b) by 0 days.

(21) Appl. No.: 14/435,351

(22) PCT Filed: Apr. 12, 2013

(86) PCT No.: PCT/EP2013/057715
§ 371 (c)(1),
(2) Date: Apr. 13, 2015

(87) PCT Pub. No.: WO2014/056632
PCT Pub. Date: Apr. 17, 2014

(65) Prior Publication Data
US 2015/0234183 A1    Aug. 20, 2015

(30) Foreign Application Priority Data
Oct. 12, 2012 (EP) .................................... 12250161

(51) Int. Cl.
*G02B 21/06* (2006.01)
*G02B 27/00* (2006.01)
(Continued)

(52) U.S. Cl.
CPC ....... *G02B 27/0081* (2013.01); *G02B 5/1819* (2013.01); *G02B 21/00* (2013.01); *G02B 21/06* (2013.01); *G02B 27/4205* (2013.01)

(58) Field of Classification Search
CPC ........ G02B 21/14; G02B 21/16; G02B 21/18; G02B 21/06; G02B 27/0081;
(Continued)

(56) References Cited

U.S. PATENT DOCUMENTS

RE35,534 E  *  6/1997  Claytor ................... G02B 3/08
                                                        359/708
5,729,382 A       3/1998  Morita et al.
(Continued)

FOREIGN PATENT DOCUMENTS

CN    101460883 A    6/2009
GB    2 360 604 A    9/2001
(Continued)

OTHER PUBLICATIONS

International Search Report for corresponding patent application No. PCT/EP2013/057715 dated Jun. 12, 2013.
(Continued)

*Primary Examiner* — William R Alexander
*Assistant Examiner* — Henry A Duong
(74) *Attorney, Agent, or Firm* — Renner, Otto, Boisselle & Sklar, LLP (57) ABSTRACT

An optical instrument includes an optical system for producing an optical image; and a diffractive element which includes a surface having an array of diffractive units. The diffractive units include replications of a pattern of separated areas which produce diffractive interference of light and generate an array of exit pupils to be viewable as a single, continuous enlarged exit pupil The areas include irregular features of different sizes in horizontal and vertical section, which have curved surfaces at lateral faces The diffractive units are disposed progressively radially outwardly from the optical axis of the diffractive element and configured progressively with an increasing angular offset. Independent of
(Continued)

location on the aperture of the diffractive element and without any relay lens arrangement, light from the received image is relayed to a common region on a viewing plane across the aperture.

32 Claims, 5 Drawing Sheets (51) Int. Cl.
*G02B 27/42* (2006.01)
*G02B 21/00* (2006.01)
*G02B 5/18* (2006.01)

(58) Field of Classification Search
CPC .. G02B 5/1819; G02B 21/00; G02B 27/4205; G01N 21/6458
USPC ........................................................ 351/370
See application file for complete search history.

(56) References Cited

U.S. PATENT DOCUMENTS

| 6,028,704 | A | 2/2000 | Freeman |
| 6,608,720 | B1 | 8/2003 | Freeman |
| 7,123,415 | B2 | 10/2006 | Mercer |
| 2001/0043163 | A1 | 11/2001 | Waldern et al. |
| 2003/0025999 | A1 | 2/2003 | Mercer |
| 2005/0237615 | A1* | 10/2005 | Urey ................... G02B 3/0062 359/566 |
| 2013/0182327 | A1 | 7/2013 | Miyasaka et al. |

FOREIGN PATENT DOCUMENTS

| JP | 2001507139 A | 5/2001 |
| JP | 2003528350 A | 9/2003 |
| TW | 261664 B | 11/1995 |
| WO | 97/35223 A1 | 9/1997 |
| WO | 1998028650 | 7/1998 |
| WO | 2001071412 A1 | 9/2001 |
| WO | 2007141589 A1 | 12/2007 |
| WO | 2010049702 A1 | 5/2010 |

OTHER PUBLICATIONS

Urey et al.; "Microlens array-based exit pupil expander for full color display applications"; Proceedings of SPIE, International Society for Optical Engineering, US, vol. 5456, No. 1, Apr. 27, 2004, pp. 227-236.

Hakan Urey; "Diffractive exit-pupil expander for display applications"; Applied Optics; US, vol. 40, No. 32, Nov. 10, 2001, pp. 5840-5851.

* cited by examiner

OPTICAL INSTRUMENTS

This application is a national phase of International Application No. PCT/EP2013/057715 filed Apr. 12, 2013 and published in the English language.

FIELD OF THE INVENTION

The present invention relates to optical instruments, especially microscopes, in particular optical instruments which have an exit pupil at which an image of an object may be viewed by an observer, and diffractive optical elements for use with the same.

BACKGROUND OF THE INVENTION

In conventional optical instruments, the size of the exit pupil is determined by a function of the numerical aperture and overall magnification of the optical instrument, and hence the size of the exit pupil is of fixed and relatively-small dimension. Consequently, it is necessary for an observer to accurately align the entrance pupil of his/her eye with the exit pupil of the optical instrument in order properly to view an image.

The present applicant has previously developed a number of different optical instruments which, through the provision of a diffractive element at an intermediate image plane, provide an exit pupil which is effectively enlarged, allowing an observer to view an image by placing his/her eye anywhere within the enlarged exit pupil. These optical instruments are disclosed in U.S. Pat. No. 6,028,704, U.S. Pat. No. 6,608,720, U.S. Pat. No. 7,123,415 and GB-A-2360604. Another optical instrument which incorporates an exit pupil expander is disclosed in US-A-2005/0237615.

The present applicant has now developed improved optical instruments, which still provide an exit pupil which is effectively enlarged, but which can provide for greater optical clarity and also avoid the need for a field lens arrangement, which, given the size of the field of view, usually represents the most expensive component within the optical instruments, being a precision-ground and polished glass component.

SUMMARY OF THE INVENTION

In one aspect the present invention provides an optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one of the exit pupils of the array of exit pupils, the diffractive units each comprising replications of a pattern of a plurality of separated areas which are effective to produce diffractive interference of light and generate a plurality of exit pupils which are displaced relative to one another in the form of an array of exit pupils, such as to be viewable as a single, continuous enlarged exit pupil, and the areas comprise irregular features of different sizes, both in horizontal and vertical section, which have curved surfaces at lateral faces thereof; wherein the diffractive units are disposed progressively radially outwardly from the optical axis of the diffractive element and configured progressively to provide for an increasing angular offset, such that, independent of location on the aperture of the diffractive element, light from the received image is relayed to a common region on a viewing plane across the aperture of the diffractive element.

In another aspect the present invention provides an optical instrument for producing an optical image to be viewed by an observer, the optical instrument comprising: an optical system for producing an optical image of an object which is viewable by an observer at an exit pupil; and a diffractive element located at an image plane of the optical system for producing an array of the exit pupils, which are perceivable as a single, enlarged exit pupil by the observer; wherein the diffractive element comprises a surface which has an array of diffractive units, each of which generates one of the exit pupils of the array of exit pupils, the diffractive units each comprising replications of a pattern of a plurality of separated areas which are effective to produce diffractive interference of light and generate a plurality of exit pupils which are displaced relative to one another in the form of an array of exit pupils, such as to be viewable as a single, continuous enlarged exit pupil, and the areas comprise irregular features of different sizes, both in horizontal and vertical section, which have curved surfaces at lateral faces thereof.

In one embodiment the diffractive element is configured to relay light from the received image to a common region on a viewing plane across the aperture of the diffractive element.

In one embodiment the diffractive units are disposed progressively radially outwardly from the optical axis of the diffractive element and configured progressively to provide for an increasing angular offset, such that, independent of location on the aperture of the diffractive element, light from the received image is relayed to the common region on the viewing plane.

In one embodiment the progressively-increasing angular offset is provided by providing the areas within each diffractive unit of different radial position with different size, shape and position.

In one embodiment the diffractive units provide for relaying of light from the received image to the common region on the viewing plane without any relay lens arrangement.

In one embodiment the surface of the diffractive element is on a substantially flat plane.

In one embodiment the curved surfaces at the lateral faces of the areas comprise frusto-conical or frusto-cylindrical surfaces and/or the lateral faces of the areas within each diffractive unit include both inwardly and outwardly curved sections.

In one embodiment the lateral faces of the areas within each diffractive unit are tilted or inclined, optionally as a rectilinear surface, tapering inwardly away from the surface of the diffractive element.

In one embodiment the areas are projections which extend from the surface of the diffractive element and/or depressions which extend into the surface of the diffractive element.

In one embodiment the replications of the patterns of areas have a pitch of from about 40 µm to about 100 µm or from about 60 µm to about 100 µm.

In one embodiment the areas each have one or more surfaces at an upper surface thereof which are substantially parallel to the surface of the diffractive element, inclined to the surface of the diffractive element and/or arcuate.

In one embodiment the upper surface of each of the areas has a curved peripheral edge.

In one embodiment the areas each have an average dimension of from about 1 µm to about 10 µm.

In one embodiment the optical instrument is a microscope.

Preferred embodiments of the present invention will now be described hereinbelow by way of example only with reference to the accompanying drawings, in which:

DETAILED DESCRIPTION OF THE INVENTION

Figure 1:
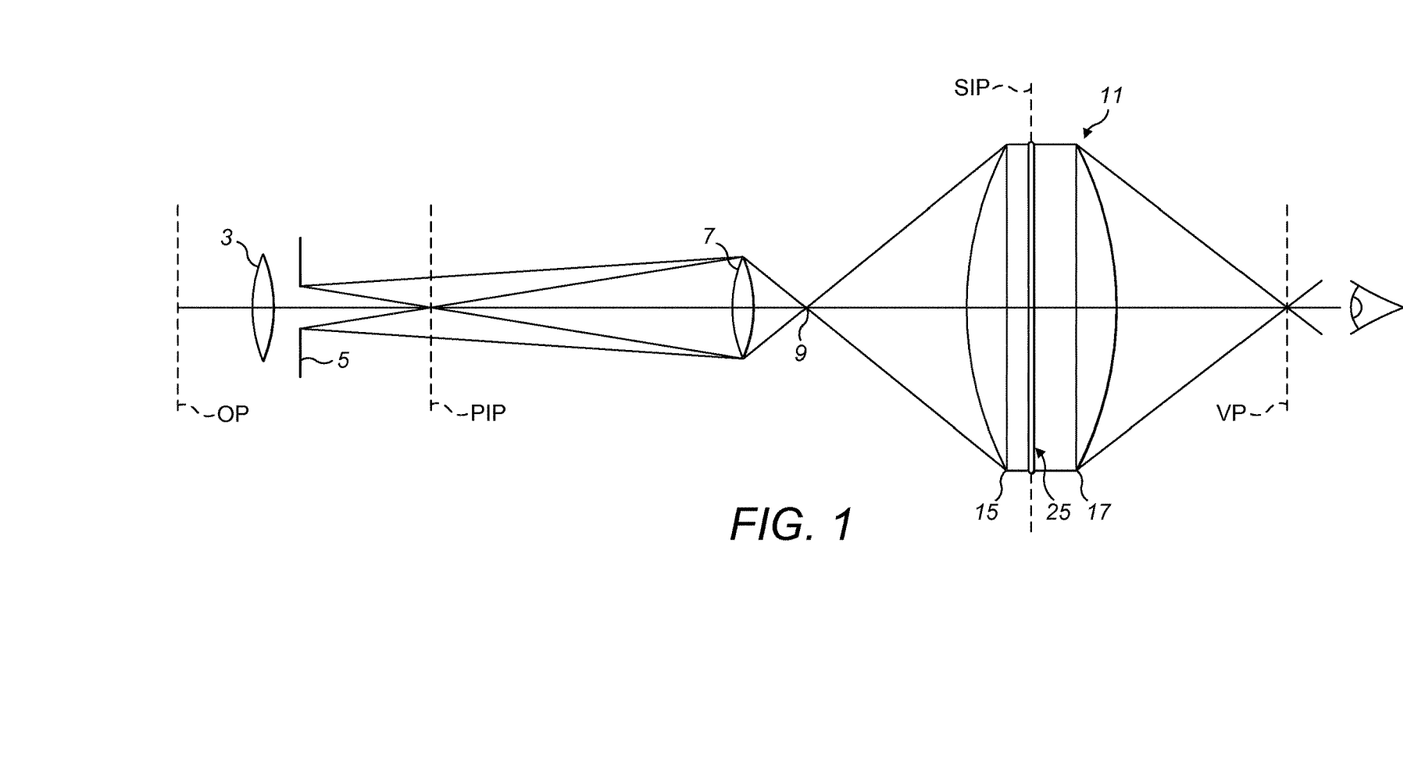
FIG. 1 illustrates an optical instrument in accordance with a first embodiment of the present invention.
Figure 2A:
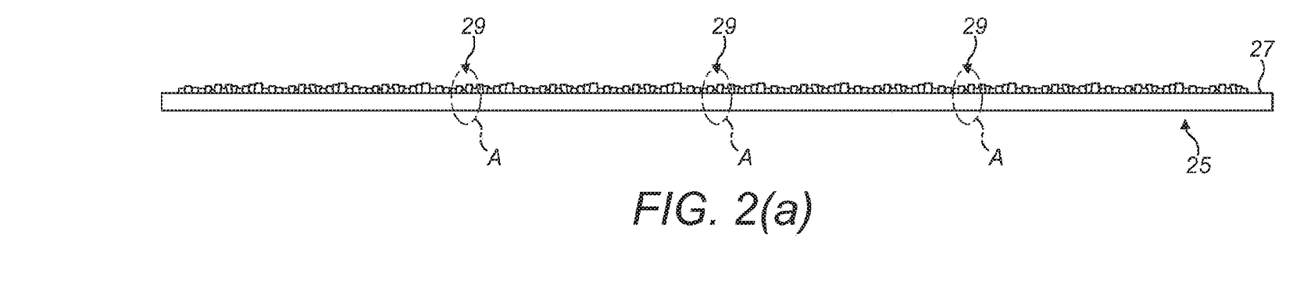
FIG. 2(a) illustrates an elevational view of a diffractive element in accordance with one embodiment of the optical instrument of FIG. 1.
Figure 2B:
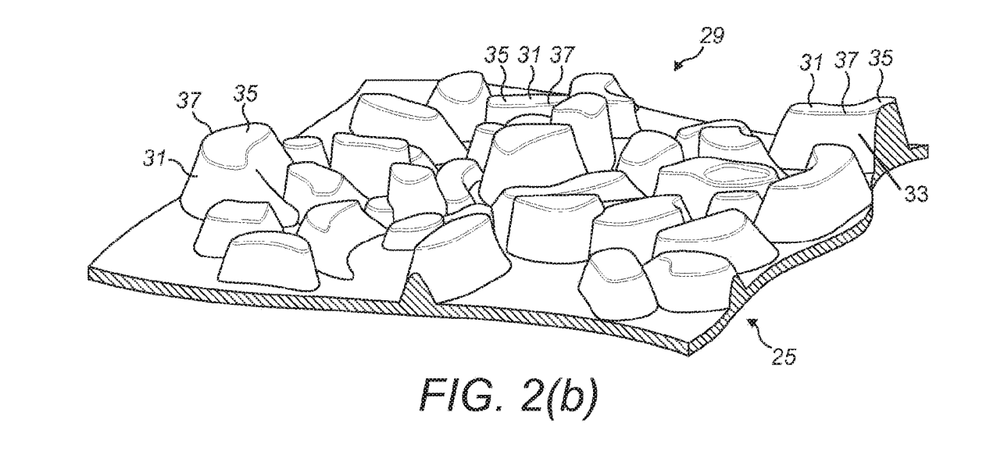
FIG. 2(b) illustrates a perspective view of one diffractive unit (represented by sections A in FIG. 2(a)) of the diffractive element of FIG. 2(a)
Figure 2C:
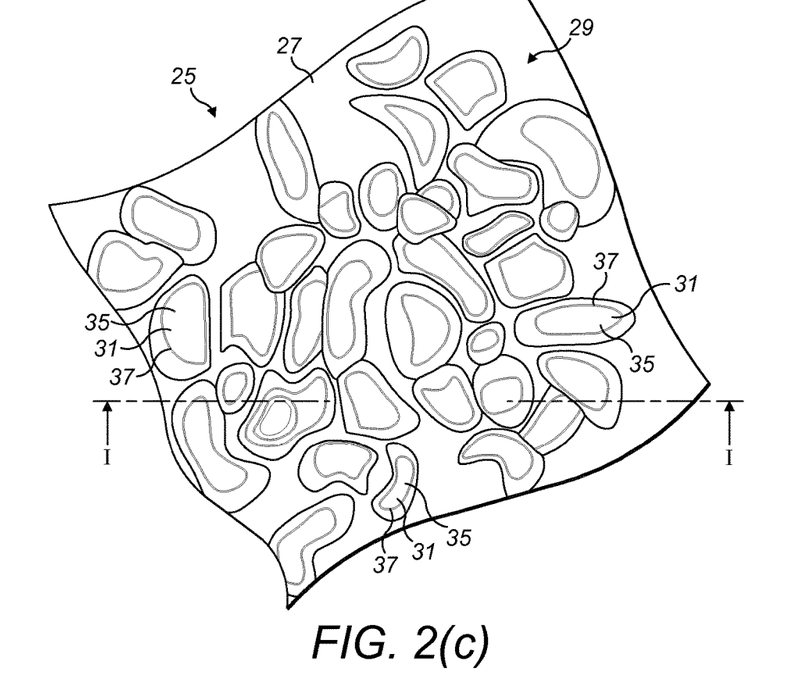
FIG. 2(c) illustrates a plan view of the one diffractive unit of FIG. 2(b)
Figure 2D:
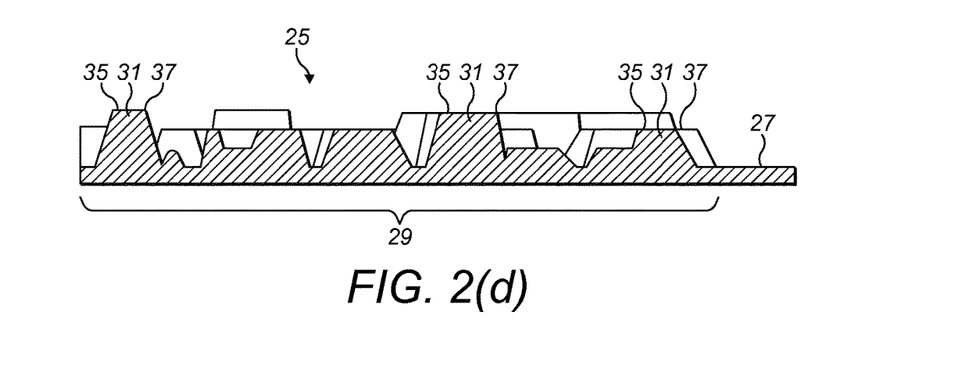
FIG. 2(d) illustrates a vertical sectional view (along section I-I in FIG. 2(c)) of the diffractive element of FIG. 2(a)

FIG. 1 illustrates a microscope in accordance with a first embodiment of the present invention, in this embodiment a projection microscope.

The microscope comprises an objective lens 3 for producing a primary image in an image plane, here a primary image plane PIP, of an object at an object plane OP, in this embodiment as defined by an aperture stop 5.

In this embodiment the microscope further comprises a projection lens 7 which images the primary image of the objective lens 3 to an image plane, here a secondary image plane SIP, and produces an image of the aperture of the objective lens 3 at the ray vertex 9 of the projection lens 7.

The microscope further comprises a field lens arrangement 11, in this embodiment comprising a pair of field lenses 15, 17, for relaying the exit pupil to a viewing plane VP, such as to be viewable by an eye of an observer.

The microscope further comprises a diffractive element 25, in this embodiment a transmissive element, which is located at the secondary image plane SIP, here intermediate the field lenses 15, 17 of the field lens arrangement 11, and is effective to produce an array of exit pupils, each corresponding to the exit pupil which would be produced in the absence of the diffractive element 25.

Through suitable design, the diffractive element 25 can be configured to provide that the exit pupils in the array of exit pupils are spaced apart or in contact, and the configuration is chosen such that the array of exit pupils appears to the eye of the observer in effect as a single, continuous enlarged exit pupil.

In one embodiment, as illustrated in FIGS. 2(a) to (d), the diffractive element 25 comprises a principal surface 27 which has an array of diffractive units 29, each of which generates one of the exit pupils of the array of exit pupils. The profile and form of the individual diffractive units 29 determines the comparative light energy within each of the individual pupil images.

In this embodiment the diffractive units 29 comprise replications of a pattern of a plurality of separated areas 31 which are effective to produce diffractive interference of light passing therethrough and generate a plurality of exit pupils which are displaced relative to one another in the form of an array of exit pupils, such as to be viewable as a single, continuous enlarged exit pupil.

In this embodiment the areas 31 comprise irregular features of different sizes, both in horizontal and vertical section, which have arcuate or curved surfaces at lateral faces 33 thereof, here frusto-conical or frusto-cylindrical surfaces. These features can vary in size but typically are in the range of about 1 µm to about 10 µm.

In this embodiment the lateral faces 33 of the areas 31 within each diffractive unit 29 include both inwardly and outwardly curved sections.

In this embodiment the lateral faces 33 are tilted or inclined, tapering inwardly away from the surface 27 of the diffractive element 25.

In this embodiment the areas 31 are projections which extend from the surface 27 of the diffractive element 25. In an alternative embodiment the areas 31 could comprise depressions which extend into the surface 27 of the diffractive element.

In this embodiment the replications of the patterns of areas 31 have a pitch of about 80 µm. In other embodiments the replications of the patterns of areas 31 can have a pitch of from about 40 µm to about 100 µm.

In this embodiment the areas 31 each have one or more surfaces at an upper surface 35 thereof. In this embodiment the one or more surfaces are substantially parallel to the surface 27 of the diffractive element 25, but could alternatively be inclined to the surface 27 of the diffractive element 25 or arcuate.

In this embodiment the upper surface 35 of each of the areas 31 has a curved peripheral edge 37, here around its entirety.

In this embodiment the areas 31 are formed by the patterning and development of an actinic photoresist. In one embodiment the pattern is formed by direct writing a pattern, using a combination of controlled electron beam and laser ablation, into actinic photoresist.

With this configuration, the microscope provides a single, enlarged exit pupil having an effective size corresponding to the array of exit pupils, and the array of exit pupils have desired optical characteristics, particularly in providing for uniform energy distribution of a polychromatic image.

Figure 3:
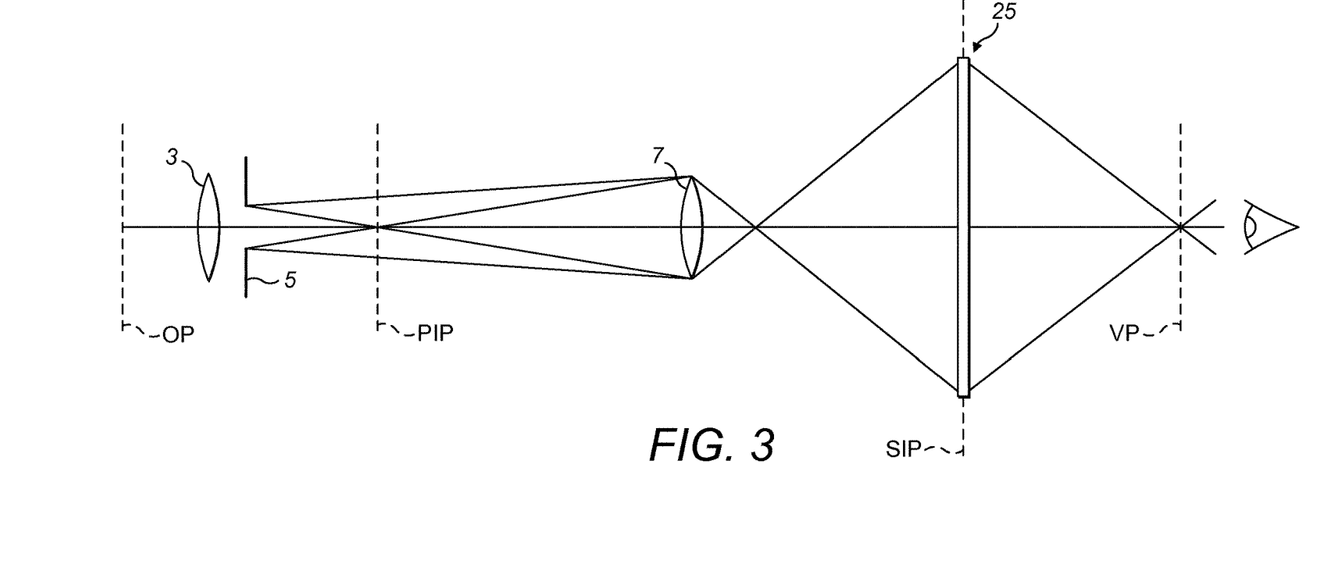
FIG. 3 illustrates an optical instrument in accordance with a second embodiment of the present invention.

FIG. 3 illustrates a microscope in accordance with a second embodiment of the present invention.

The microscope of this embodiment is similar to the microscope of the first-described embodiment, and thus, in order to avoid duplication of description, only the differences will be described in detail with like parts designating like reference signs.

The microscope of this embodiment differs from the first-described embodiment in that the field lens arrangement 11 is omitted, and instead the diffractive element 25 is configured to relay light from the received image to a common region on the viewing plane VP across the aperture of the diffractive element 25, in this embodiment centered on the optical axis of the diffractive element 25.

Figure 4:
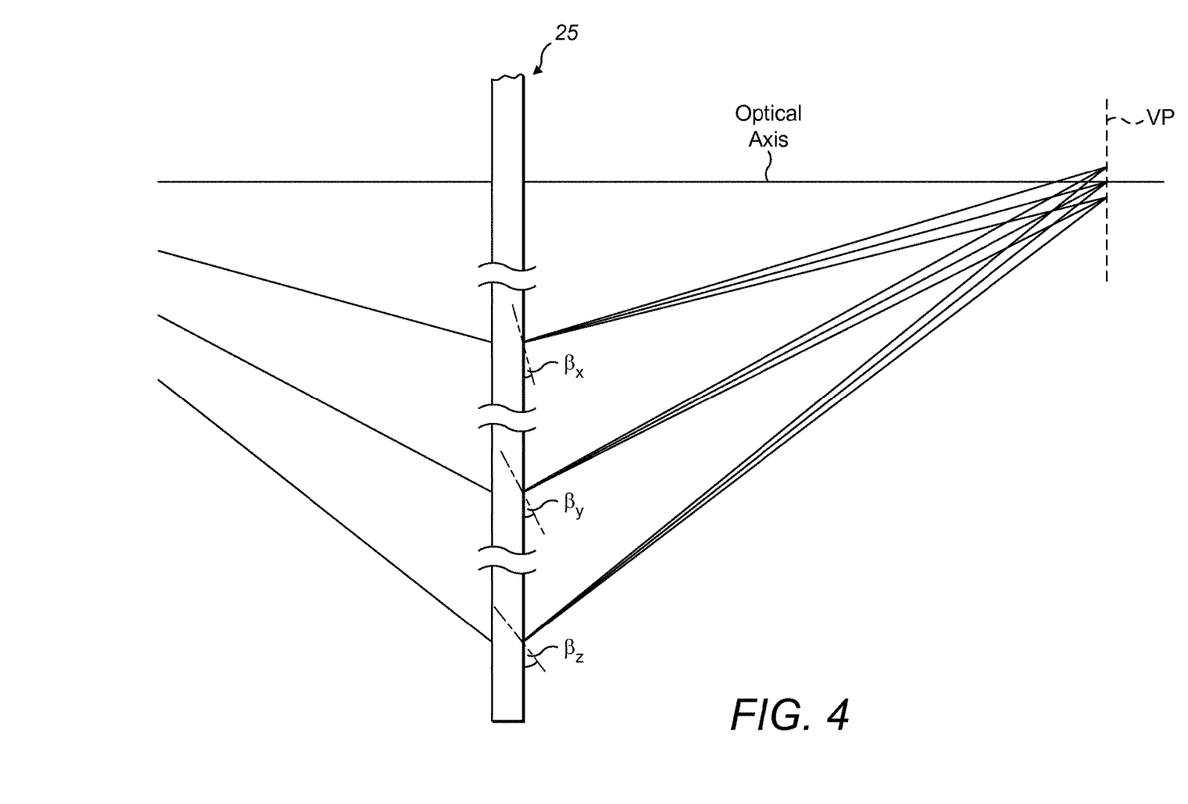
FIG. 4 illustrates the expansion and beam steering provided by the diffractive units of the diffractive element of the optical instrument of FIG. 3.

In this embodiment the diffractive units 29 which are disposed progressively radially outwardly from the optical axis of the diffractive element 25 are configured progressively to provide for an increasing angular offset, such that, independent of location on the diffractive element 25, light from the received image is relayed to a common region. FIG. 4 illustrates the expansion and beam steering provided by the diffractive units 29.

In this embodiment the progressively-increasing angular offset is provided by the sizing, shaping and positioning of the areas 31 within each diffractive unit 29. This sizing, shaping and positioning is determined by conventional diffractive principles, and modelled, such as by Zemax (Radiant Zemax, Redmond, USA) or LightTrans VirtualLab (Jenoptik Optical Systems, W. Henrietta, USA).

Finally, it will be understood that the present invention has been described in its preferred embodiments and can be modified in many different ways without departing from the scope of the invention as defined by the appended claims.

For example, in the described embodiments the diffractive element 25 is a transmissive element, but it will be understood that the diffractive element 25 could be provided as a reflective element.

The invention claimed is:

1. An optical instrument for producing an optical image to be viewed by an observer, the optical instrument comprising:
   an optical system for producing an optical image of an object which is viewable by an observer at an exit pupil on a viewing plane; and
   a diffractive element located at an image plane of the optical system for producing an array of exit pupils, which are perceivable as a single, enlarged exit pupil by the observer;
   wherein the diffractive element comprises a surface which has an array of diffractive units, each of which generates one of the exit pupils of the array of exit pupils, the diffractive units each comprising replications of a pattern of a plurality of separated areas which are effective to produce diffractive interference of light and generate a plurality of exit pupils which are displaced relative to one another in the form of an array of exit pupils, such as to be viewable as a single, continuous enlarged exit pupil, and the areas comprise irregular features of different sizes, both in horizontal and vertical section, which have curved surfaces at lateral faces thereof;
   wherein the diffractive units are disposed progressively radially outwardly from the optical axis of the diffractive element and configured progressively to provide for an increasing angular offset of the optical path thereat, such that, independent of location on the aperture of the diffractive element and without any relay lens arrangement between the diffractive element and the viewing plane, light from the received image is relayed to a common region on the viewing plane across the aperture of the diffractive element.

2. The instrument of claim 1, wherein the progressively-increasing angular offset is provided by providing the areas within each progressively-radially outward diffractive unit to be of different size, shape and position.

3. The instrument of claim 1, wherein the surface of the diffractive element is on a substantially flat plane.

4. The instrument of claim 1, wherein the curved surfaces at the lateral faces of the areas comprise frusto-conical or frusto-cylindrical surfaces.

5. The instrument of claim 1, wherein the lateral faces of the areas within each diffractive unit are tilted or inclined.

6. The instrument of claim 1, wherein the areas are projections which extend from the surface of the diffractive element.

7. The instrument of claim 1, wherein the replications of the patterns of areas have a pitch of from about 40 μm to about 100 μm.

8. The instrument of claim 1, wherein the areas each have one or more surfaces at an upper surface thereof which are substantially parallel to the surface of the diffractive element.

9. The instrument of claim 8, wherein the areas each have one or more surfaces at an upper surface thereof and the upper surface of each of the areas has a curved peripheral edge.

10. The instrument of claim 1, wherein the areas each have an average dimension of from about 1 μm to about 10 μm.

11. The instrument of claim 1, wherein the optical instrument is a microscope.

12. The instrument of claim 1, wherein the lateral faces of the areas within each diffractive unit include both inwardly and outwardly curved sections.

13. The instrument of claim 1, wherein the lateral faces of the areas within each diffractive unit are tilted or inclined as a rectilinear surface, tapering inwardly away from the surface of the diffractive element.

14. The instrument of claim 1, wherein the areas are depressions which extend into the surface of the diffractive element.

15. The instrument of claim 1, wherein the replications of the patterns of areas have a pitch of from about 60 μm to about 100 μm.

16. The instrument of claim 1, wherein the areas each have one or more surfaces at an upper surface thereof which are inclined to the surface of the diffractive element.

17. The instrument of claim 1, wherein the areas each have one or more surfaces at an upper surface thereof which are arcuate.

18. An optical instrument for producing an optical image to be viewed by an observer, the optical instrument comprising:
   an optical system for producing an optical image of an object which is viewable by an observer at an exit pupil on a viewing plane; and
   a diffractive element located at an image plane of the optical system for producing an array of exit pupils, which are perceivable as a single, enlarged exit pupil by the observer;
   wherein the diffractive element comprises a surface which has an array of diffractive units, each of which generates one of the exit pupils of the array of exit pupils, the diffractive units each comprising replications of a pattern of a plurality of separated areas which are effective to produce diffractive interference of light and generate a plurality of exit pupils which are displaced relative to one another in the form of an array of exit pupils, such as to be viewable as a single, continuous enlarged exit pupil, and the areas comprise irregular features of different sizes, both in horizontal and vertical section, which have curved surfaces at lateral faces thereof, and the lateral faces of the areas of each diffractive unit are tilted or inclined.

19. The instrument of claim 18, wherein the surface of the diffractive element is on a substantially flat plane.

20. The instrument of claim 18, wherein the curved surfaces at the lateral faces of the areas comprise frusto-conical or frusto-cylindrical surfaces.

21. The instrument of claim 18, wherein the lateral faces of the areas within each diffractive unit include both inwardly and outwardly curved sections.

22. The instrument of claim 18, wherein the lateral faces of the areas within each diffractive unit are tilted or inclined as a rectilinear surface, tapering inwardly away from the surface of the diffractive element.

23. The instrument of claim 18, wherein the areas are projections which extend from the surface of the diffractive element.

24. The instrument of claim 18, wherein the areas are depressions which extend into the surface of the diffractive element.

25. The instrument of claim 18, wherein the replications of the patterns of areas have a pitch of from about 40 μm to about 100 μm.

26. The instrument of claim 18, wherein the replications of the patterns of areas have a pitch of from about 60 μm to about 100 μm.

27. The instrument of claim 18, wherein the areas each have one or more surfaces at an upper surface thereof which are substantially parallel to the surface of the diffractive element.

28. The instrument of claim 18, wherein the areas each have one or more surfaces at an upper surface thereof which are inclined to the surface of the diffractive element.

29. The instrument of claim 18, wherein the areas each have one or more surfaces at an upper surface thereof which are arcuate.

30. The instrument of claim 18, wherein the areas each have one or more surfaces at an upper surface thereof and the upper surface of each of the areas has a curved peripheral edge.

31. The instrument of claim 18, wherein the areas each have an average dimension of from about 1 μm to about 10 μm.

32. The instrument of claim 18, wherein the optical instrument is a microscope.

* * * * *